United States Patent [19]

Fardal et al.

[11] 4,381,036

[45] Apr. 26, 1983

[54] PLANTER HEIGHT AND MARKER CONTROL SYSTEM

[75] Inventors: Randolph G. Fardal, Chicago; Edward L. Robinson, Jr., Naperville; William C. Swanson, Clarendon Hills, all of Ill.

[73] Assignee: International Harvester Co., Chicago, Ill.

[21] Appl. No.: 156,538

[22] Filed: Jun. 5, 1980

[51] Int. Cl.³ .......................................... A01B 63/108
[52] U.S. Cl. ..................................... 172/2; 172/127; 172/130
[58] Field of Search ............................. 172/2–4.5, 172/6, 7, 126–132, 9; 37/DIG. 1, DIG. 20; 91/517–518, 191, 413, 420, 445, 410, 514, 515

[56] References Cited

U.S. PATENT DOCUMENTS

| | | | |
|---|---|---|---|
| 2,460,774 | 2/1949 | Trautman | 91/515 |
| 3,677,348 | 7/1972 | Boetto et al. | 172/130 |
| 3,715,572 | 2/1973 | Bennett | 172/3 |
| 3,760,688 | 9/1973 | Dummer | 91/515 |
| 3,975,890 | 8/1976 | Rodger | 172/4 |
| 4,034,649 | 7/1977 | Harvey et al. | 91/515 |
| 4,067,394 | 1/1978 | Deckler | 172/2 |
| 4,145,980 | 3/1979 | Boots | 172/4 |
| 4,161,229 | 7/1979 | Mifsud | 91/515 |
| 4,176,721 | 12/1979 | Poggemiller et al. | 172/4 |
| 4,207,950 | 6/1980 | Kinzenbaw | 172/126 |
| 4,279,138 | 7/1981 | Van Der Lely et al. | 172/4 |
| 4,285,268 | 8/1981 | Deckler | 172/2 |

*Primary Examiner*—Vance Y. Hum
*Attorney, Agent, or Firm*—John W. Gaines; F. David Aubuchon

[57] ABSTRACT

The planter height and control system is adapted for use with an agricultural planter assembly which is adapted to be mechanically and hydraulically coupled to a tractor and which includes a frame, a plurality of equally spaced planter units mounted to the frame, and at least two wheel assemblies on each side of the planter assembly. Each wheel assembly is pivotally mounted to the frame and includes a piston and cylinder mechanism which, when the piston rod thereof is extended, pivots the wheel assembly downwardly to effect raising of the planter units. The system includes an electrical-hydraulic control circuit for parallel coupling the piston and cylinder mechanisms of the at least two wheel assemblies on each side of the planter assembly and for limiting the retraction of each piston rod of each piston and cylinder mechanism to a predetermined limit less than the full return stroke of the piston rod on the lowering of the planters thereby to control the height of the planter frame above the ground and thereby to provide limited relative movement of the piston rods of the piston and cylinder mechanisms for the at least two wheel assemblies on each side of the planter assembly as the planter assembly traverses uneven ground.

14 Claims, 7 Drawing Figures

*FIG. 7*

PLANTER HEIGHT AND MARKER CONTROL SYSTEM

BACKGROUND OF THE INVENTION

1. Field of the Invention

The present invention relates to a planter height and marker control system for use with an agricultural planter assembly which is adapted to be mechanically and hydraulically coupled to a tractor and which includes a frame, a plurality of planter units mounted to the frame, and two pairs of wheels assemblies mounted to the frame, one pair on each side of the center line of the planter assembly. More specifically, the present invention relates to an electrical-hydraulic control circuit of the system for parallel coupling the piston and cylinder mechanisms and for limiting the retraction of each piston rod of each piston and cylinder mechanism to a predetermined limit less than the full return stroke thereof on the lowering of the planter units, thereby to control the height of the planter frame above the ground and to provide limited movement of the wheel assemblies so that when one wheel assembly encounters an obstacle, it can move upwardly while the other wheel assembly moves downwardly as the planter assembly traverses uneven ground.

2. Description of the Prior Art

Heretofore, it has been proposed to provide a planter assembly having a planter frame, a plurality of planter units, e.g., eight equally spaced planter units, mounted to the frame, and at least two pairs of wheel assemblies on either side of the center line of the planter assembly and mounted to the frame. In such a previously proposed planter assembly, each wheel assembly has a double acting piston and cylinder mechanism associated therewith for pivoting the wheel assembly downwardly to raise the planters and to pivot the wheel assembly upwardly to lower the planters. The hydraulic circuit for operating the piston and cylinder mechanisms included a main valve assembly having at least three positions, the first position being a neutral position where coupling of the piston and cylinder mechanisms to a line from a pump and a line leading to a sump are blocked, a second position where the line from the pump is coupled to the head side of the cylinder of each piston and cylinder mechanism for causing extension of the piston rods and the line to the sump is connected to the piston rod side of each cylinder, and a third position where the line from the pump is coupled to the piston rod sides of the cylinders and the line to the sump is connected to the head sides of the cylinders in each piston and cylinder mechanism.

In the operation of the hydraulic circuit and main valve assembly, the main valve asembly is moved to the second position thereof to fully extend the piston rods to fully raise the planter units and is moved to the third position thereof to fully retract the piston rods to fully raise the wheel assemblies. With this arrangement, when the wheel assemblies are fully raised to fully lower the planter units, jarring of the planter assembly occurs when the wheels travel over uneven terrain. This has often resulted in awkward and uncomfortable operation of the planter assembly and has caused excessive stress and wear on the component parts of the planter assembly and the hydraulic system therefor.

Also, in the operation of a planter assembly, it is desired to raise and lower respective markers on opposite sides of the planter assembly each time the planter units of the assembly are raised and the tractor pulling the planter assembly turns the planter assembly 180° to start another planting sweep. When this is done, it is desirable to provide means for planting the next group of adjacent rows in proper spaced relationship to the group of rows just planted. This is accomplished by dragging a marker along on the first planting sweep and then on the return planting sweep, aligning a wheel of the tractor with the track on the ground made by the marker which ensures proper spacing of the next group of rows being planted relative to the group of rows just planted. Heretofore, the operator in the cabin of the tractor would operate a hydraulic valve assembly for causing extension of a desired marker after the tractor has turned 180° and retraction of the other marker.

At times, the operator will forget to extend the desired marker and it is desirable to provide means for automatically extending a desired marker and retracting the other marker after the planter units are raised and the tractor proceeds to turn 180° to begin a return planting sweep across a section of ground.

As will be described in greater detail hereinafter, the planter height and marker control system of the present invention includes electrical-hydraulic control circuits for limiting the extent of retraction of the piston rods for the pair of parallel coupled piston and cylinder mechanisms for the pair of wheel assemblies on each side of the center line of the planter assembly so that relative movement of the piston rods can take place, whereby when uneven terrain is encountered, one wheel assembly can go up while the other wheel assembly goes down, in either one or both pairs of piston and cylinder mechanisms associated with a respective pair of wheel assemblies.

Also as will be described in greater detail hereinafter, the electrical-hydraulic control circuits include an automatic alternating marker system for causing automatic extension of a desired marker when the planter units are raised and retraction of the other marker.

SUMMARY OF THE INVENTION

According to the invention there is provided for use with an agricultural planter assembly which is adapted to be mechanically and hydraulically coupled to a tractor and which includes a frame, a plurality of equally spaced planter units mounted to the frame, and at least two wheel assemblies on each side of the planter assembly, each wheel assembly being pivotally mounted to the frame and including a piston and cylinder mechanism which, when the piston rod thereof is extended, pivots the wheel assembly downwardly to effect raising of the planter, electrical-hydraulic control means for parallel coupling the piston and cylinder mechanisms of the at least two wheel assemblies on each side of the planter assembly, and for limiting the retraction of each piston rod of each piston and cylinder mechanism to a predetermined limit less than the full return stroke of the piston rod on the lowering of the planters thereby to control the height of the planter frame above the ground and thereby to provide limited relative movement of the piston rods of the piston and cylinder mechanisms for the at least two wheel assemblies as the planter assembly traverses uneven ground.

Additionally according to the invention, the electrical-hydraulic control means is characterized by including hydraulic circuit means for supplying and relieving pressurized hydraulic fluid from the piston and cylinder mechanisms for the at least two wheel assemblies on each side of the planter assembly, said hydraulic circuit means including flow divider means for dividing pressurized hydraulic fluid from a source thereof in equal amounts to the respective parallel coupled piston and cylinder mechanisms on a forward stroke of the piston rod of each mechanism for the at least two wheel assemblies on each side of the planter assembly, the flow divider means of the hydraulic circuit means comprising a rotary flow divider for dividing an input or output of hydraulic fluid to or from the parallel coupled piston and cylinder mechanisms into two increments and, on the delivery of pressurized hydraulic fluid to the wheel assemblies, delivering one increment to one of two separate hydraulic lines each of which is coupled to the parallel coupled piston and cylinder mechanisms for the at least two wheel assemblies on one side of the planter assembly, the electrical-hydraulic control means comprising means for sensing the extent of the lowering of the wheel assembly to raise the planter units, said sensing means comprising actual count means for counting the actual increments of pressurized hydraulic fluid relieved from each of the parallel coupled piston and cylinder mechanisms for the wheel assemblies on one side of the planter assembly, the electrical-hydraulic control means further including means for storeing a predetermined count equal to the increments of pressurized hydraulic fluid relieved for retraction of the piston rods of each piston and cylinder mechanism to said predetermined limit less than the full return stroke thereof, means for comparing the actual count with the stored count, and means for stopping the flow of pressurized hydraulic fluid to the rotary flow divider when the actual count equals the stored count.

Further according to the invention the electrical-hydraulic control means includes means for sensing the extent of lowering of the wheel assemblies, as the piston rod of each piston and cylinder mechanism associated with each assembly is extended to less than the full forward stroke thereof to raise the planter a limited distance above the ground, and for generating a signal related to the extent of lowering, means for storing said signal related the extent of lowering sensed, and means for using that signal for controlling the retraction of the piston rods so that the piston rods, on the raising of the wheel assemblies, are retracted only to the predetermined limit of retraction established by said electrical-hydraulic control means.

DESCRIPTION OF THE PREFERRED EMBODIMENT(S)

Figure 1:
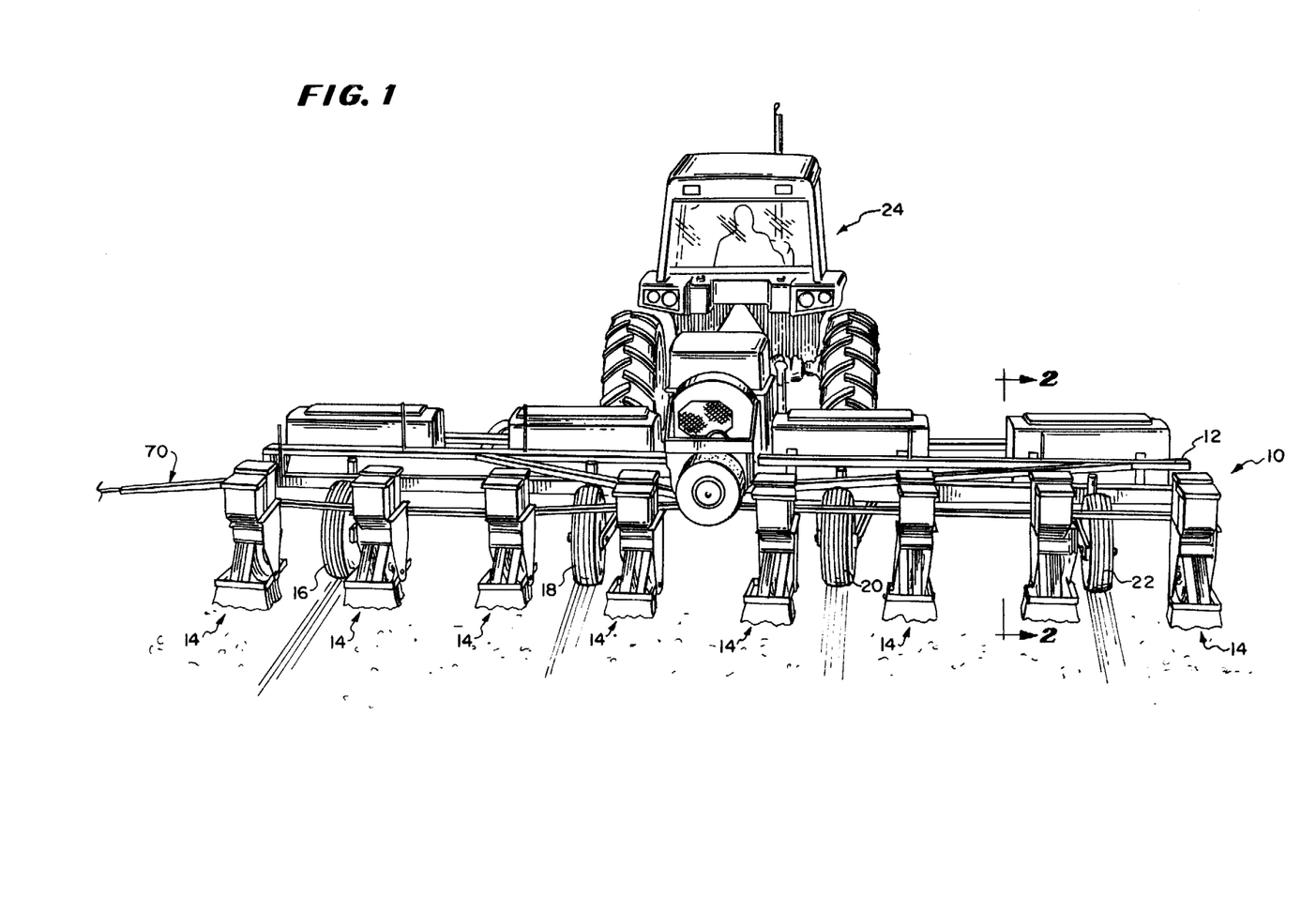
FIG. 1 is a perspective back view of an eight planter unit, planter assembly having two pairs of parallel coupled wheel assemblies on either side of the center line of the planter assembly and shows the planter assembly coupled to a tractor.

Referring now to the drawings in greater detail, there is illustrated in FIG. 1 an eight planter unit, planter assembly 10 including a frame 12 to which are mounted a plurality of eight planter units 14. Mounted to the frame 12 on either side of the center line of the planter assembly 10 is a pair of wheel assemblies 16 and 18 on one side and 20 and 22 on the other side.

As shown, the planter assembly 10 is adapted to be mechanically and hydraulically coupled to a tractor 24.

Figure 2:
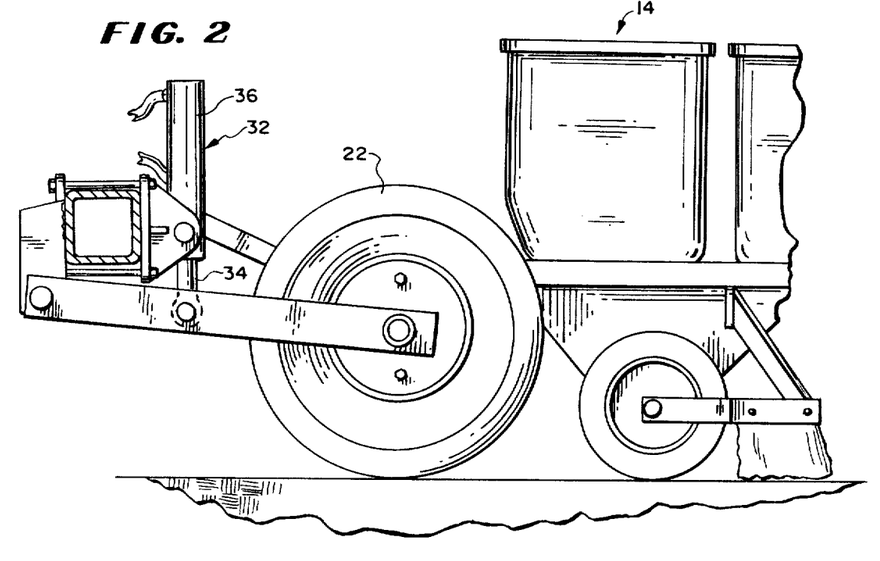
FIG. 2 is a fragmentary sectional view taken along line 2—2 of FIG. 1 and shows a piston and cylinder mechanism associated with one of the wheel assemblies with the piston rod thereof only partially retracted into the cylinder in accordance with the teachings of the present invention.
Figure 3:
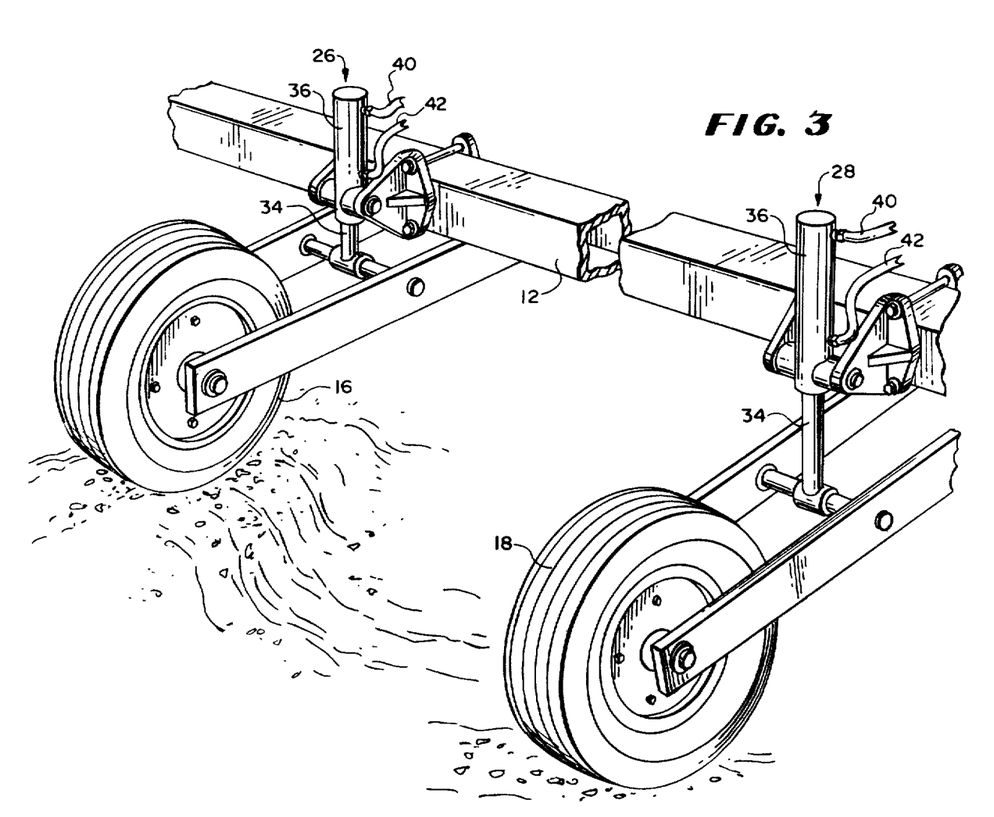
FIG. 3 is a fragmentary perspective view of a pair of wheel assemblies, the piston and cylinder mechanisms of which are parallel coupled, with the piston rods thereof not fully retracted into the cylinders in accordance with the teachings of the present invention so that the piston rod of one cylinder can move further in the cylinder to allow raising of one wheel assembly, with the piston rod of the other mechanism extending further from the cylinder as the wheel assemblies traverse uneven ground.
Figure 4:
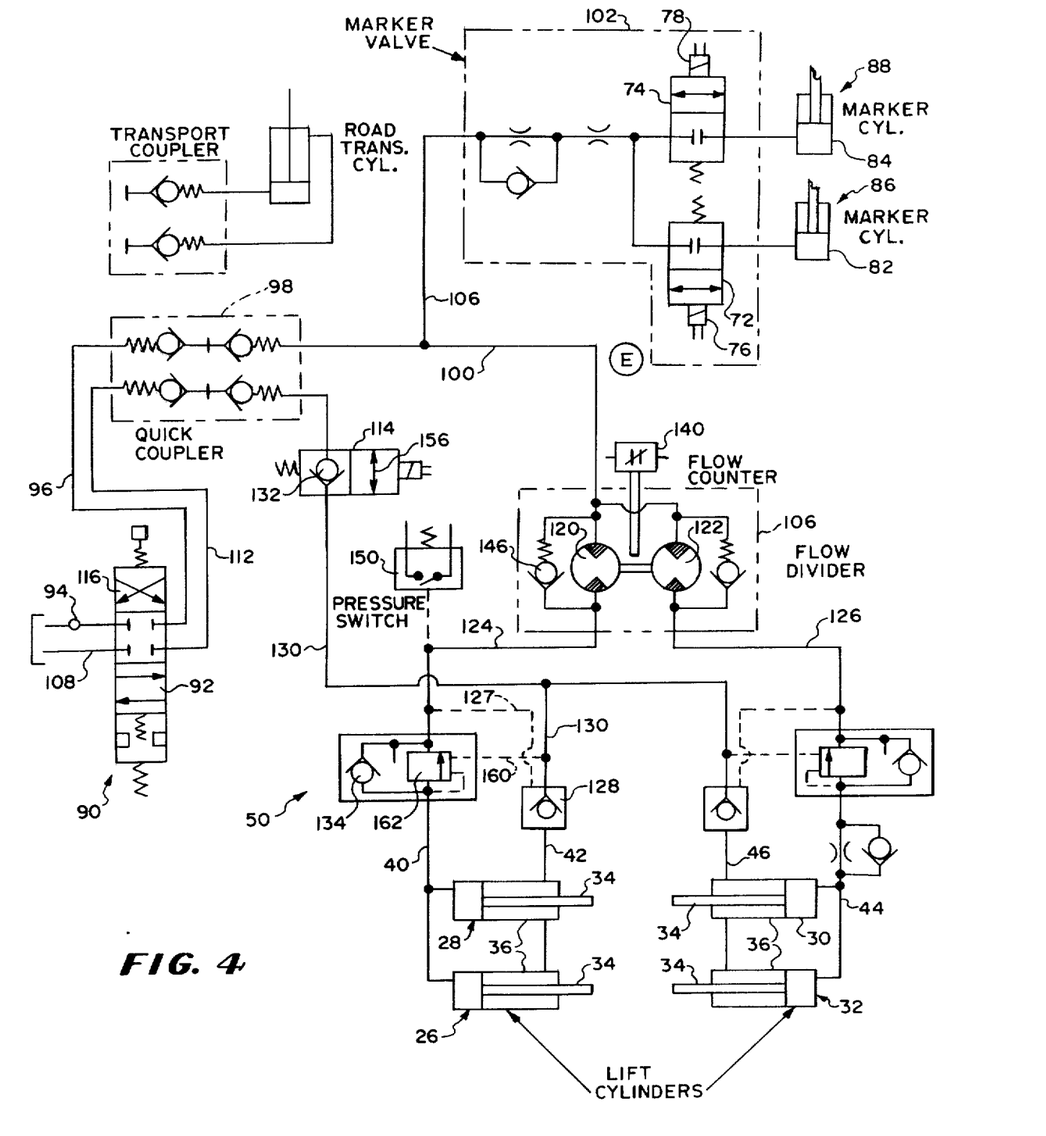
FIG. 4 is a schematic circuit diagram of the hydraulic circuit of the present invention.

As shown in FIGS. 2, 3 and 4, each of the wheel assemblies 16, 18, 20 and 22 is pivotally mounted to the frame 12 and has associated therewith a piston and cylinder mechanism 26, 28, 30 or 32 (FIG. 4) which is operable to extend or retract the piston rod 34 thereof from or into the cylinder 36 thereof. The pair of piston and cylinder mechanisms 26 and 28 for the wheel assemblies 16 and 18 are parallel coupled to a hydraulic fluid line 40 leading to the head sides of the cylinders 36 and to a hydraulic fluid line 42 connected to the rod sides of the cylinders 36. Likewise, the cylinders 36 of the piston and cylinder mechanisms 30 and 32 are connected to a hyraulic fluid line 44 on the head sides thereof and to a hydraulic fluid line 46 on the rod sides thereof. A hydraulic control circuit 50 (FIG. 4) and an electrical control circuit 60 (FIG. 5) are operable to control the amount of pressurized hydraulic fluid supplied to the hydraulic line 40 for the parallel coupled piston and cylinder mechanisms 26 and 28 and the hydraulic line 46 for the piston and cylinder mechanisms 30 and 32 so that the piston rods 34 thereof are retracted only 80% of their return stroke into the cylinders 36 thereof. As a result of this control, when one of the pair of wheel assemblies 16, 18 and 20,22, such as the pair of wheel assemblies 16 and 18 shown in FIG. 3, travel over uneven terrain, the wheel assembly 16 can go up, causing the piston rod 34 to go further into the cylinder 36 of the piston and cylinder mechanism 26, while at the same time, the piston rod 34 of the piston and cylinder mechanism 28 can be extended further from the cylinder 36.

As partially shown in FIG. 1, and as described in further detail in a co-pending application Ser. No. 156,537 filed June 5, 1980 and entitled: AUTOMATIC ALTERNATING MARKER SYSTEM, the planter assembly 10 is provided with two markers 70, one on each side of the planter assembly 10, one of which is shown extended from one side of the planter assembly 10 in FIG. 1.

As described in the co-pending application, each marker includes a solenoid-operated valve 72 or 74

(FIG. 4) with an associated solenoid 76, 78 for supplying or relieving pressurized hydraulic fluid from a cylinder 80 or 82 of a marker piston and cylinder mechanism 84 or 86 for enabling raising and retraction of one marker 70 and extension and lowering of the other marker 70 to enable the extended marker 70 to mark a track when the planter units 14 are lowered and the planter assembly 10 is making a planting sweep across a section of ground. Then after the planting sweep has been completed and a plurality, e.g., eight rows have been planted across a section of ground, the planter units 14 are raised and the tractor 24 is turned 180° to turn the planter assembly 10 180° to begin a second planting sweep. At this time, after the planter units 14 are raised, the extended marker 70 is retracted and the formally retracted marker 70 is extended. Now the tractor operator aligns a wheel of the tractor 24 with the track marked by the previously extended marker 70 and begins to plant the next group of adjacent rows. The following of the track made by the previously extended marker 70 insures that the next group of eight rows being planted will be properly spaced from the first group of eight rows planted. Also, the now-extended marker 70 will make another track to be followed on the third planting sweep and on and on until the section of ground is planted.

Figure 6:
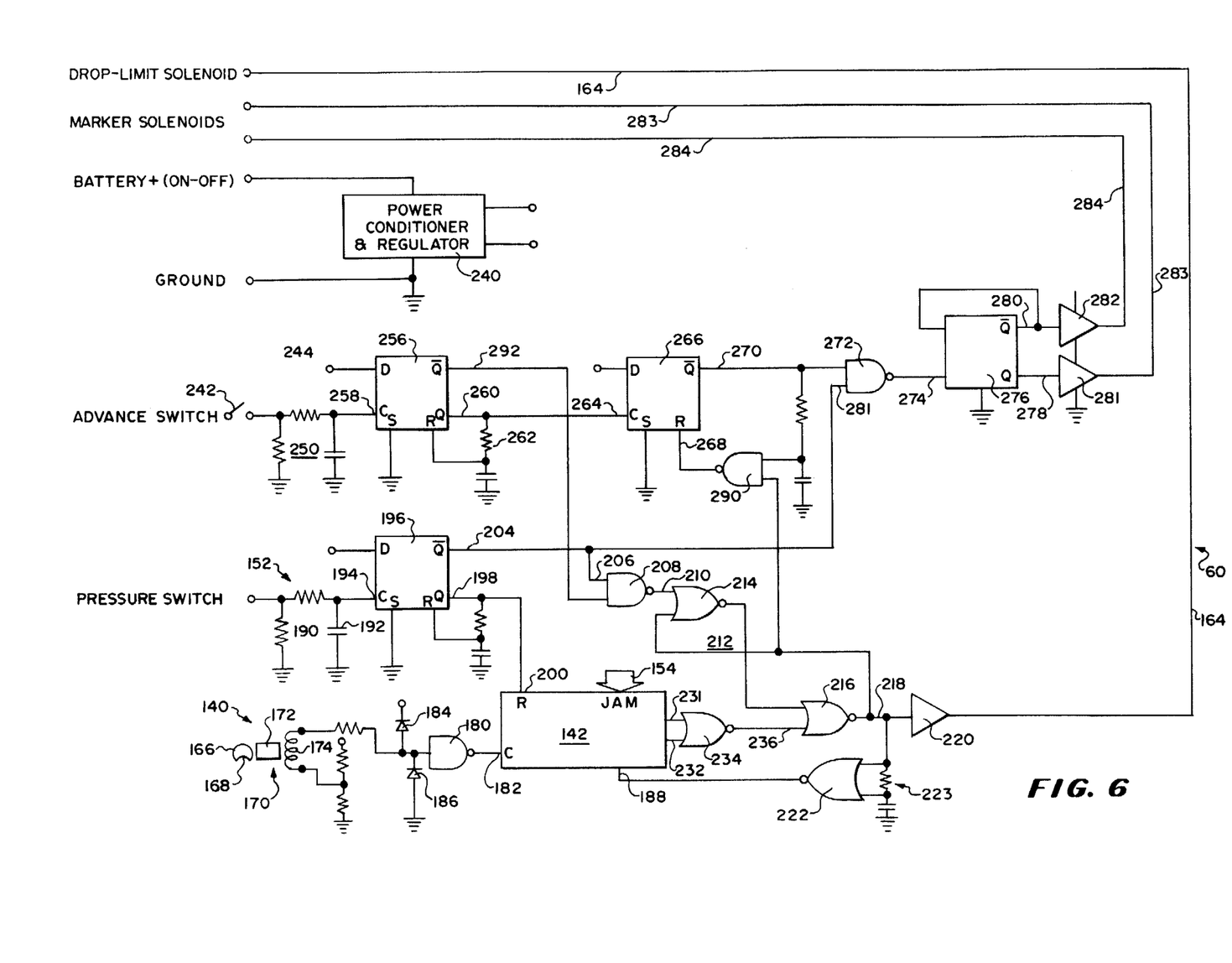
FIG. 6 is a schematic circuit diagram of the electrical circuit of the present invention.

As will be described hereinafter, the hydraulic control circuit 50 and the associated electrical control circuit 60 control operation of the marker, piston and cylinder assemblies 86 and 88 so that once a desired marker 70 is extended and the other marker 70 is retracted, the marker solenoids 76 and 78 are appropriately energized and de-energized on the raising of the planter units 14 after a planting sweep to enable automatic alternating marker extension and retraction.

Referring now to the hydraulic circuit 50 illustrated in FIG. 4, the hydraulic circuit 50 includes a main valve assembly 90 which is mounted in the cabin of the tractor 24 and which has at least three positions. The first position is a neutral position as shown in FIG. 4.

The second position is where direct lines 92 are positioned to connect the output of a pump 94 to a hydraulic line 96 which is coupled through a quick coupler 98 to a hydraulic line 100 which supplies hydraulic fluid to a marker valve assembly 102 containing the solenoid valves 72 and 74. The hydraulic line 100 is also coupled to the input of a rotary flow divider 106 which will be described in further detail hereinafter. In the second position where one of the direct lines 92 couples the pump 94 to the hydraulic line 96, another line connects a line 108 leading to a sump 110 to a hydraulic line 112 which is coupled to the quick coupler 98 to one side of a control solenoid valve 114.

As will be described in greater detail hereinafter, the second position or direct line 92 position of the main valve assembly 90 is a down-wheel/up-planter position.

The third position of the main valve assembly 90 is an up-wheel/down-planter position where cross-lines 116 couple the pump 94 to the hydraulic line 112 and the sump line 108 to the hydraulic line 96.

When the operator moves the main valve assembly 92 to the second down-wheel/up-planter position, pressurized hydraulic fluid from the pump 94 is transmitted via the line 96 through the line 100 to the rotary flow divider 106 where on each rotation of shafts 120 and 122, as a result of the pressure of the fuid received by the rotary flow divider 106, an increment of pressurized fluid is supplied to a hydraulic line 124 and hydraulic line 126. The increment of pressurized fluid delivered to the line 124 is then supplied to a pilot valve line 127 until the pressure thereof reaches a certain level to open a one-way check valve 128 which allows fluid in the line 42 connected to the rod side of the cylinders 36 of the piston and cylinder mechanisms 26 and 28 to be relieved from the piston rod sides of the cylinders 36, through the open check valve 128, a return line 130, through a check valve 132 in the solenoid valve 114, through the quick coupler 98, to the return line 112 connected to the sump line 108. As increments of pressurized fluid are received in the fluid line 124, they pass through a check valve 134 to the fluid line 40 connected to the head sides of the cylinders 36 of the piston and cylinder mechanisms 26 and 28.

The above-described supplying of increments of pressurized fluid to the line 124 and likewise equal increments to the fluid line 126, continues until the piston rods 34 are fully extended so that the planter 14 are fully raised. Each increment is counted by a flow counter 140 and supplied to a counter circuit 142 (FIG. 6) for purposes which will be described in greater detail hereinafter in connection with the description of FIG. 6.

By maintaining the valve assembly 90 in the second position thereof, after the rods 34, at least on one side of the planter assembly 10, have been fully extended, no more pressurized fluid can be delivered to the line 124 and so the pressurized fluid flows around the shaft 120 through a check valve 146 while the increments of pressurized fluid flowing around the shaft 122 continue to flow into the line 126 until the rods 34 on the other side of the planter assembly 10 are fully extended.

As will be described in greater detail hereinafter, when the pressure in the line 124 builds up to a certain level, it actuates a pressure switch 150 which supplies a signal to a pressure switch circuit 152.

As will be described in greater detail hereinafter, when the piston rods 34 are fully extended thereby to fully raise the planter units 14, and thereby to actuate the pressure switch 150, the count from the flow counter 140 which had been stored in the counter circuit 142 is cleared and a predetermined count supplied to a JAM input 154 of the counter circuit 142 is inputted into the counter circuit 142.

Also at this time, the solenoid valve 114 is actuated to move the solenoid valve to an open line position 156 thereof in series with the fluid line 130 so that hydraulic fluid can flow either way through the solenoid valve 114.

Now when the valve assembly 90 is moved to the third position thereof where the cross lines 116 connect the pump 94 to the hydraulic line 112 and the sump line 108 to the hydraulic line 96, the piston rods 34 can be retracted into the cylinders 36 in the manner to be described below. In the third position, pressurized hydraulic fluid flows through the hydraulic line 112, the quick coupler 98, through the open line position 156 of the solenoid valve 114 through the fluid line 130, through the check valve 128, to the hydraulic line 42, to the rod sides of the cylinders 36. As the pressure builds up in the line 130, such pressure operates a pilot valve line 160 to move a valve 162 to an open position communicating the hydraulic line 40 with the hydraulic line 124. When this pressure is reached in the line 130, hydraulic fluid can be relieved from the head sides of the pistons 36 through the hydraulic line 40, through the valve 162, through the hydraulic line 124, to the shaft 120 of the rotary flow divider 106. Likewise, fluid is relieved from the head side of the cylinders 36 of the piston and cylinder mechanisms 30 and 32, through the line 44, and the line 126, to the shaft 122 of the rotary flow divider 106. The pressure of the fluid being relieved rotates the shafts 120 and 122, and each revolution of the shafts 120 and 122 is counted by the flow counter 140. When the count by the flow counter 140 equals the predetermined count inputted at the JAM input 154, a signal is generated as will be described hereinafter which is supplied to an electrical output lead 164 of the electrical circuit 60 which is then applied to the solenoid valve 114 to move the same to the valve close position where the check valve 132 prevents further pressurized fluid from flowing through the valve 114 to the hydraulic line 130. This will occur before the piston rods 34 are fully retracted into the cylinders 36, and defines a limit of retraction of the piston rods 34. According to the teachings of the present invention, the count of increments of fluid passing through the flow divider 106 that is equal to the count JAMed into the JAM input 154 of the counter circuit 142, is such that only 80% of the piston rods 34 are retracted into the cylinders 36.

Figure 5:
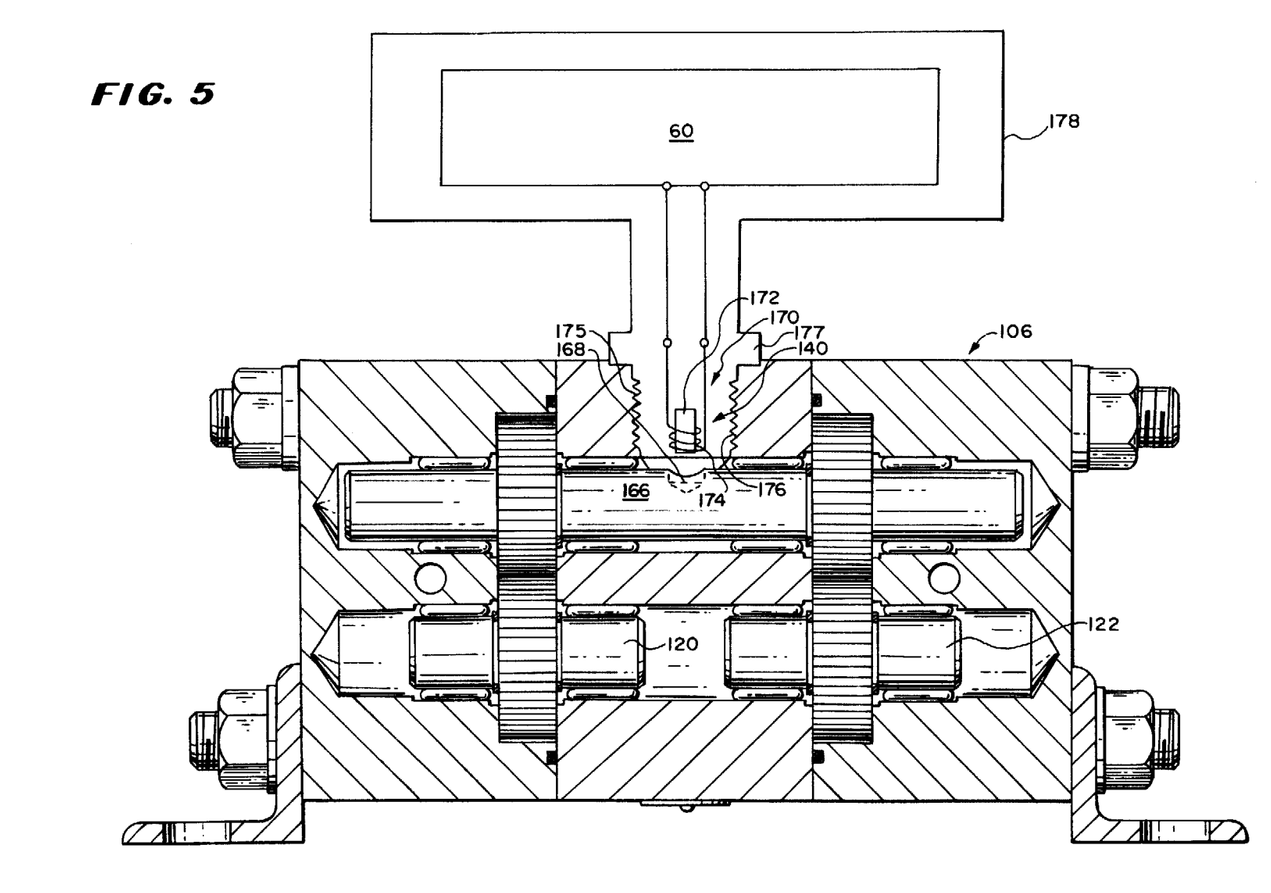
FIG. 5 is a sectional view of the rotary flow divider utilized in the hydraulic circuit shown in FIG. 4, and shows the reluctance circuit coupled to the rotary flow divider for sensing revolutions of a shaft of the rotary flow divider.

Referring to FIG. 5 there is illustrated therein a cross-section of the rotary flow divider 106 which includes the shafts 120 and 122 which are coupled by appropriate gearing to another shaft 166 which maintains the shafts 120 and 122 rotating in synchronism. As shown, the shaft 166 has a notch 168 therein and the area of the shaft adjacent the notch 168 forms part of a reluctance circuit 170 which is part of the flow counter 140. As shown, the reluctance circuit 170 not only includes the portion of the shaft 166 adjacent the notch 168 but also a magnetized metal core 172 and an electrical coil 174 around the metal core 172. It will be understood that with the coil 174 energized by the resulting magnetic field, each time the shaft 166 makes a revolution so as to bring the notch 168 opposite the core 172, the reluctance of the magnetic path including the core 172 and the shaft 168 is increased so as to generate an electrical signal in the coil 174 which is then supplied to the counter circuit 142.

As shown in FIG. 5, the reluctance circuit 170 is mounted within a threaded plug 175 which is threadedly received within a bore 176 in the rotary flow divider 106. The plug 175 has a collar 177 which bears against the outer surface of the rotary flow divider 106 to provide a fluid-tight coupling to prevent high pressure hydraulic fluid from escaping through the bore 176. The plug 175 is then connected to a container 178 within which the electrical circuit 60 is mounted.

The rotary flow divider 106 and the container 178 are mounted on the frame 12 and appropriate electrical connections extend from the container 178 to the cabin of the tractor 24 and to the other electrical sensing or electrically operated devices in the cabin of the tractor 24 or on the frame 12.

Referring now to FIG. 6, the electrical circuit 60 includes the flow counter 140 comprising the reluctance circuit 170, the counter circuit 142 and the pressure electrical circuit 152. As shown, the coil 174 is coupled to a buffer NAND circuit 180 the output of which is connected to a clock input 182 of the counter circuit 142. Circuit damage, such as to the NAND circuit 180 from large pulses generated in the coil 174, is prevented by clipping diodes 184 and 186 which are connected to the input to the NAND circuit 180. The NAND circuit 180 provides a sharp edge pulse to the counter 140 which is an eight-bit counter.

The counter circuit 142 will count the pulses received at the clock input 182 upwardly if the piston rods 34 are being extended and the input at an up-down input 188 of the counter circuit 142 has a logic 1 signal thereon which logic 1 signal is supplied after the rods 34 are retracted the predetermined amount and the planters 14 are in a down position as will be described in greater detail hereinafter.

When the piston rods 34 are fully extended and there is a pressure buildup in the line 124 to cause the pressure switch 150 to be closed, a signal is applied to the pressure switch circuit 152. This signal is first received by an integrator circuit 190 of the pressure circuit 152 which requires that the pressure switch 150 be closed for a predetermined period of time until a certain voltage level is built up in a capacitor 192 of the integrator circuit 190. This voltage level on the capacitor 192 is then supplied to a clock input 194 of a pressure/monostable multivibrator 196. When this occurs, a pulse of predetermined width and amplitude is generated at the Q output 198 of the monostable multivibrator 196 and is supplied to a reset input 200 of the counter circuit 142. Upon receiving this reset signal, the counter 142 clears the count inputted at the clock input 182 and reinputs the predetermined count at the JAM input 154 so that the counter circuit is now ready for a lowering of the planter units 14 as a result of the raising of the wheel assemblies 16, 18, 20 and 22 as the piston rods 34 are extended.

It will be understood that if the piston rods 34 were not fully extended so that a predetermined high pressure was not built up in the line 124, a reset signal is not supplied to the reset input 200 and instead the counter circuit 142 retains the upward count. This is important so that when the valve assembly 90 is moved to the third position for lowering the planter units 14, the number of increments of pressurized fluid which are relieved from the head sides of the pistons 36 will only be the amount counted as the planter units 14 were going up and the piston rods 34 were being extended. In this way the piston rods 34 will always be retracted to a predetermined limit of their return stroke which, as explained previously is, preferably eighty percent of the return stroke of the piston rods 34.

Summarizing, if the piston rods are fully extended, the pressure buildup in the line 124 causes actuation of the pressure switch 150 which supplies a reset signal to the reset input 200 of the counter circuit 142 thereby to clear the upward incremental count and input the predetermined count at the JAM input 154. However, if the piston rods were not fully extended but only extended part way so as to raise the planter units 14 over an obstacle, such as a waterway area where planting is not to be done, then, when the plwanter units are to be lowered by raising of the wheel assemblies 16, 18, 20 and 22, they will only be raised to the predetermined height as established by the predetermined limit of retraction of the piston rods 34.

Also, when the monostable multivibrator 196 is clocked to supply an output signal at the Q output 198 which is supplied to the reset input 200 of the counter circuit 142, an inverted signal appears at the $\overline{Q}$ output 204 of the monostable multivibrator 196 and is supplied to an input 206 of a NAND circuit 208 to change the output thereof from 0 to 1 to 0. This output is supplied to a set input 210 of a set-reset bistable multivibrator 212 formed by NOR circuit 214 and NOR circuit 216. This results in a change in the signal level state at the output 218 of the bistable multivibrator 212 from a logic 0 to a logic 1. This logic 1 is supplied to a driver circuit 220 to place a signal on the output lead 164 to cause opening of the solenoid valve 114 by coupling the through line 156 to the hydraulic line 130. At the same time, this logic 1 signal is supplied to a NOR gate 222 to change the output thereof from logic 1 to logic 0 and this output is supplied to the up-down input 188 of the counter circuit 142 so that it is now ready to count downwardly or decrement. An R-C circuit 223 is connected to NOR gate 222 to establish a time delay in the change in logic at the input 188 to permit counter circuit 142 to decrement below 0.

Now when the operator moves the valve assembly 90 to the third position thereof, the solenoid valve 114 is set in the open position thereof with the line 156 communicating with the line 130 so that pressurized hydraulic fluid can flow through the solenoid valve 114. At this pressurized fluid flows into the rod sides of the cylinders 36, fluid relieved from the head sides of the cylinders 36 passes through the rotary flow divider 106 and, as each increment rotates around the shaft 120 or shaft 122, the flow counter 140 inputs a count at the clock input 182 of the counter circuit 142. This causes a decrement of the predetermined count inputted at the JAM input 154 until the predetermined count has been decremented to 0 at which time the carry outputs 231 and 232 from the counter circuit 142 go from logic 1 to logic 0. This logic level is passed through a NOR gate 234 which changes its output from 0 to 1 and this output is supplied to a reset input 236 of the set-reset bistable multivibrator 212 to cause the output 218 of the NOR circuit 216 to go from logic 1 to logic 0, which signal is applied to the driver circuit 220 which deenergizes the solenoid valve 114 to close the same and place the check valve 132 therein in communication with the line 130. At this point the piston rods 34 have only been retracted eighty percent into the cylinders 36.

As shown the electrical circuit 60 also includes a power conditioner and regulator circuit 240 which supplies a regulator voltage to the circuit components of the electrical circuit 60.

Also as shown the electrical circuit 60 includes a marker advance switch 242 connectable to an advance switch circuit 244 which includes an integrator circuit 250 similar to the integrator circuit 190 and a marker/monostable monovibrator 256 similar to the monostable multivabrator 196. When the marker advance switch 242 is actuated or closed the integrator circuit 190 integrates a voltage until a certain voltage level is reached which is then supplied to a clock input 258 of the marker/monostable multivibrator 256. At this point in time a signal is generated at the Q output 260 of the monostable multivibrator 256 which by reason of the capacitor-resistor circuit 262 has a predetermined amplitude and width. This output signal at the Q output 260 is passed through a clock input 264 of a gating circuit 266. If the logic signal level at a reset input 268 of the gating circuit 266 is 0, a signal will be passed through the $\overline{Q}$ output 270 thereof which is applied through a NAND gate 272 to a clock input 274 of a toggle bistable multivibrator 276 which has a Q output 278 and inverted through $\overline{Q}$ output 280. A toggle signal at the input 274 will change the logic signal levels at the outputs 278 and 280. These logic signal levels are applied to respective driver circuits 281 and 282 which have outputs coupled to lead 283 and 284 leading respectively to the solenoids 76 and 78 of the marker solenoid valves 72 and 74. Thus, operation of the advance switch 242, when there is a logic 0 at the reset input 268 of the gating circuit 266, will cause toggling of the outputs 278 and 280 to energize one of the solenoids 76 and 78 and deenergize the other solenoid 78 or 76 thereby to cause retraction of an extended marker 70 and extension of the other marker 70.

It will be noted that the inverted $\overline{Q}$ output 204 of the pressure/monostable multivibrator 196 is also coupled to an input 281 of the NAND gate 272 so that when a signal pulse going from logic 1 to logic 0 and then back to logic 1 is supplied from the output 204 to the NAND gate 272, a clock signal is supplied to the toggle input 274, whereby on the operation of the pressure switch 152 at the raising of the planter units 14 and the build up of pressure in line 124, the toggle bistable multivibrator 276 is toggled to retract the extended marker 70 and extend the retracted marker 70 so that the planter assembly 10 is automatically ready on the next planting sweep to make the proper desired mark or track with the desired marker 70.

It will be understood that when the rods 34 are retracted and the planter units 14 are in a lowered position, the output 218 of the bistable multivibrator 212 goes from logic 1 to logic 0 and this logic 0 is applied to an inhibiting gate 290 to cause the output thereof to go from logic 0 to logic 1 and thereby place an inhibit signal at the reset input 268 of the gating circuit 266. As a result, when the units 14 are down and the marker advance switch 242 is accidently actuated for a predetermined length of time the signal applied to the clock input 264 of gating circuit 266 is not passed through to the output 270 because of the presence of the logic 1 at the reset input 268. However, a signal at the $\overline{Q}$ output 292 of the marker/monostable multivibrator 256 is supplied to the NAND gate 208 thereby to apply a set signal to the input 210 of multivibrator 212 to set the multivibrator 212. This results in changing the logic output at the output 218 from logic 0 to logic 1 and this logic 1, applied to the inhibit gate 290, then causes a logic 0 to be applied to the reset gate 268. This means that the gating circuit 266, on the next operation of the advance switch 242, will pass a signal therethrough to toggle the toggle bistable multivibrator 276 to enable retraction of the extended marker 70 and extension of retracted marker 70.

The monostable multivibrator circuits, the gating circuit and the toggle bistable multivibrator circuit are realized by one half of a CMOS 4013 integrated circuit. The counter circuit 142 is realized by two CMOS 4029 four bit counters. The NAND gates are realized by CMOS 4011 integrated circuits and the NOR gates are realized by CMOS 4001 integrated circuits. Also, the counter circuit can have a bit 7 thereof connected to a pull up resistor to provide a JAM input 154 binary count of $CO_H$ (11000000 equal to 192 increments) for one planter assembly, and by cutting the resistor out, a JAM input 154 binary count of $80_H$ (10000000 equal to 128 increments) is provided for another planter assembly.

Figure 7:
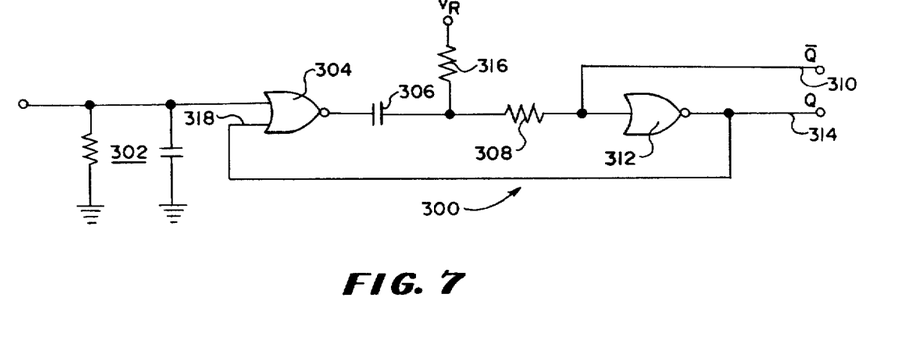
FIG. 7 is a schematic circuit diagram of another form of monostable multivibrator which can be utilized in the electrical circuit shown in FIG. 6.

If desired, the monostable multivibrators can be realized by monostable multivibrator circuit 300 shown in FIG. 7. This circuit has a integrater circuit 302 coupled to the input of a NOR gate 304 having its output coupled through a capacitor 306 and a resistor 308 to a $\overline{Q}$ output 310. The resistor 308 is also coupled to an input of another NOR gate 312 the output of which forms a Q output 314. The junction between the capacitor 306 and the resistor 308 is connected through a resistor 316 to the regulated voltage. Also the Q output 314 is coupled to an input 318 of NOR gate 304.

In the operation of the circuit 300 a pulse from the integrator circuit 302 going from logic 0 to logic 1 causes the output of the NOR gate 304 to go from logic 1 to logic 0 causing a discharge of the capacitor 306 which causes the Q̄ output 310 to go from logic 1 to logic 0 and then back to logic 1. In the meantime the NOR gate 312 output 314 goes from logic 0 to logic 1 to logic 0. The connection from output 314 to the input 318 latches the monostable multivibrator circuit 300 for a predetermined period of time.

The circuit 300 shown in FIG. 7 is less expensive than the circuit formed by the CMOS 4013 integrated circuit which form with an RC circuit the monostable multivibrators shown in FIG. 6.

The electrical-hydraulic control circuits of the present invention described above have a number of advantages, some of which have been described above and others of which are inherent in the invention. Accordingly the scope of the invention is only to be limited as necessitated by the accompanying claims.

We claim:

1. For use with an agricultural planter assembly which includes a frame, a plurality of equally spaced planter units mounted to the frame, and at least two wheel assemblies (16, 18) on each side of the planter assembly supporting same, each wheel assembly being pivotally mounted to the frame and including a piston and cylinder mechanism which, when the piston rod thereof is extended on a forward stroke, pivots the wheel assembly downwardly to effect raising of the frame and planter units, electrical-hydraulic control means for parallel coupling (40, 42) the piston and cylinder mechanisms of the at least two wheel assemblies on each side of the planter assembly, and for limiting the retraction of each piston rod of each piston and cylinder mechanism to a predetermined limit less than the full return stroke of the piston rod on the lowering of the planter units thereby to control the height of the planter frame above the ground and thereby to provide limited relative movement of the piston rods of the piston and cylinder mechanisms for the at least two wheel assemblies as the planter assembly traverses uneven ground, said electrical-hydraulic control means including means for sensing the extent of lowering of the wheel assembly, as the piston rod of each piston and cylinder mechanism associated with each assembly is extended to less than the full forward stroke thereof to raise the planter assembly a limited distance above the ground, means connected to the sensing means for storing an actual signal of equivalent extent to the actual extent for the just said extension of the piston rods to less than the full forward stroke thereof, means for generating a signal of desired equivalent extent to the desired extent of retraction of the piston rods of each of the parallel coupled piston and cylinder mechanisms for the wheel assemblies on one side of the planter assembly, means (140, 154, 142, 234, 236, 216) for comparing the desired signal with the stored signal, and interruption means (220, 114) connected to the comparing means operative for causing the electrical-hydraulic control means to automatically interrupt and stop retraction of the piston rods when the desired signal equals the stored signal.

2. For use with an agricultural planter assembly which includes a frame, a plurality of equally spaced planter units mounted to the frame, and at least two wheel assemblies on each side of the planter assembly, each wheel assembly being pivotally mounted to the frame and including a piston and cylinder mechanism which, when the piston rod thereof is extended, pivots the wheel assembly downwardly to effect raising of the planter units, electrical-hydraulic control means for parallel coupling the piston and cylinder mechanism of the at least two wheel assemblies on each side of the planter assembly, and for limiting the retraction of each piston rod of each piston and cylinder mechanism to a predetermined limit less than the full return stroke of the piston rod on the lowering of the planter units thereby to control the height of the planter frame above the ground and thereby to provide limited relative movement of the piston rods of the piston and cylinder mechanisms for the at least two wheel assemblies as the planter assembly traverses uneven ground, the electrical-hydraulic control means including hydraulic circuit means for supplying and relieving pressurized hydraulic fluid from the piston and cylinder mechanisms for the at least two wheel assemblies on each side of the planter assembly, said hydraulic circuit means including flow divider means for dividing pressurized hydraulic fluid from a source thereof in equal amounts to the respective parallel coupled piston and cylinder mechanisms on a forward stroke of the piston rod of each mechanism for the at least two wheel assemblies on each side of the planter assembly, said divider means of the hydraulic circuit means comprising a rotary flow divider for dividing an input or output of hydraulic fluid to or from the parallel coupled piston and cylinder mechanisms into two increments and, on the delivery of pressurized hydraulic fluid to the wheel assemblies, delivering each increment to one of two separate hydraulic lines each of which is coupled to the parallel coupled piston and cylinder mechanisms for the at least two wheel assemblies on one side of the planter assembly, said electrical-hydraulic control means comprising means for counting the increments of pressurized hydraulic fluid respectively delivered to and relieved from each of the parallel coupled piston and cylinder mechanisms for the wheel assemblies on one side of the planter, and interrupter means (220, 114) connected to the counting means operative for causing the electrical-hydraulic control means to automatically interrupt and stop the flow of pressurized hydraulic fluid to the rotary flow divider always on piston rod retraction and always at a point when the increment count being attained on retraction equals the counterpart increment count attained on extension.

3. For use with an agricultural planter assembly which is adapted to be mechanically and hydraulically coupled to a tractor and which includes a frame, a plurality of equally spaced planter units mounted to the frame, and at least two wheel assemblies on each side of the planter assembly, each wheel assembly being pivotally mounted to the frame and including a piston and cylinder mechanism which, when the piston rod thereof is extended, pivots the wheel assembly downwardly to effect raising of the planter units, electrical-hydraulic control means for parallel coupling the piston and cylinder mechanisms of the at least two wheel assemblies on each side of the planter assembly, and for limiting the retraction of each piston rod of each piston and cylinder mechanism to a predetermined limit less than the full return stroke of the piston rod on the lowering of the planter units thereby to control the height of the planter frame above the ground and thereby to provide limited relative movement of the piston rods of the piston and cylinder mechanisms for the at least two wheel assemblies as the planter assembly traverses uneven ground;

the electrical-hydraulic control means including hydraulic circuit means for supplying and relieving pressurized hydraulic fluid from the piston and cylinder mechanism for the at least two wheel assemblies on each side of the planter assembly, said hydraulic circuit means including flow divider means for dividing pressurized hydraulic fluid from a source thereof in equal amounts to the respective parallel coupled piston and cylinder mechanisms on a forward stroke of the piston rod of each mechanism for the at least two wheel assemblies on each side of the planter assembly;

said flow divider means of the hydraulic circuit means comprising a rotary flow divider for dividing an input or output of hydraulic fluid to or from the parallel coupled piston and cylinder mechanisms into two increments and, on the delivery of pressurized hydraulic fluid to the wheel assemblies, delivering each increment to one of two separate hydraulic lines each of which is coupled to the parallel coupled piston and cylinder mechanisms for the at least two wheel assemblies on one side of the planter assembly;

the electrical-hydraulic control means comprising means for sensing the extent of the lowering of the wheel assemblies to raise the planter units, said sensing means comprising means for counting the increments of pressurized hydraulic fluid relieved from each of the parallel coupled piston and cylinder mechanisms for the wheel assemblies on one side of the planter assembly;

the electrical-hydraulic control means further including means for storing a predetermined count equal to the increments of pressurized hydraulic fluid relieved for retraction of the piston rods of each piston and cylinder mechanism to said predetermined limit less than the full return stroke thereof, means for comparing the actual count with the stored count and means for stopping the flow of pressurized hydraulic fluid to the rotary flow divider when the actual count equals the stored count.

4. The electrical-hydraulic control means according to claim 3 wherein said means for comparing the actual count with the stored count includes means for decrementing the stored count as each signal generated by an actual count is received by said comparing means, said storage means including an electronic counter and said electronic counter being operable to count negatively to compensate for a slight over-shoot in the number of increments of pressurized hydraulic fluid relieved from the parallel coupled piston and cylinder mechanisms in the time lag that occurs between the generation of a signal to stop the supply of pressurized hydraulic fluid and the time that such flow is actually stopped.

5. For use with an agricultural planter assembly which is adapted to be mechanically and hydraulically coupled to a tractor and which includes a frame, a plurality of equally spaced planter units mounted to the frame, and at least two wheel assemblies on each side of the planter assembly, each wheel assembly being pivotally mounted to the frame and including a piston and cylinder mechanism which, when the piston rod thereof is extended, pivots the wheel assembly downwardly to effect raising of the planter units, electrical-hydraulic control means for parallel coupling the piston and cylinder mechanisms of the at least two wheel assemblies on each side of the planter assembly, and for limiting the retraction of each piston rod of each piston and cylinder mechanism to a predetermined limit less than the full return stroke of the piston rod on the lowering of the planter units thereby to control the height of the planter frame above the ground and thereby to provide limited relative movement of the piston rods of the piston and cylinder mechanisms for the at least two wheel assemblies as the planter assembly traverses on uneven ground;

the electrical-hydraulic control means including hydraulic circuit means for supplying and relieving pressurized hydraulic fluid from the piston and cylinder mechanism for the at least two wheel assemblies on each side of the planter assembly, said hydraulic circuit means including flow divider means for dividing pressurized hydraulic fluid from a source thereof in equal amounts to the respective parallel coupled piston and cylinder mechanisms on a forward stroke of the piston rod of each mechanism for the at least two wheel assemblies on each side of the planter assembly;

said flow divider means of the hydraulic circuit means comprises a rotary flow divider for dividing an input or output of hydraulic fluid to or from the parallel coupled piston and cylinder mechanisms into two increments and, on the delivery of pressurized hydraulic fluid to the wheel assemblies, delivering each increment to one of two separate hydraulic lines each of which is coupled to the parallel coupled piston and cylinder mechanisms for the at least two wheel assemblies on one side of the planter assembly;

the electrical-hydraulic control means comprising means for sensing the extent of the lowering of the wheel assemblies to raise the planter units, said sensing means comprising means for counting the increments of pressurized hydraulic fluid relieved from each of the parallel coupled piston and cylinder mechanisms for the wheel assemblies on one side of the planter assembly;

the electrical-hydraulic control means characterized wherein said rotary flow divider includes a shaft which makes one revolution for each increment of fluid passing therethrough, said sensing means includes a magnetic circuit having a magnetic path which includes said rotating shaft, an electrical coil associated with said reluctance circuit, said shaft having a notch therein which is adapted to traverse the magnetic path on each revolution thereof so that the reluctance of the reluctance circuit is altered each time the notch is in the magnetic path of the reluctance circuit thereby to generate an electrical signal in said electrical coil, and said electrical signal defining a count of an increment of pressurized hydraulic fluid supplied from the rotary flow divider on each revolution of said shaft.

6. For use with an agricultural planter assembly which is adapted to be mechanically and hydraulically coupled to a tractor and which includes a frame, a plurality of equally spaced planter units mounted to the frame, and at least two wheel assemblies on each side of the planter assembly, each wheel assembly being pivotally mounted to the frame and including a piston and cylinder mechanism which, when the piston rod thereof is extended, pivots the wheel assembly downwardly to effect raising of the planter units, electrical-hydraulic control means for parallel coupling the piston and cylinder mechanisms of the at least two wheel assemblies on each side of the planter assembly, and for limiting the retraction of each piston rod of each piston and cylinder mechanism to a predetermined limit less than the full return stroke of the piston rod on the lowering of the planter units thereby to control the height of the planter frame above the ground and thereby to provide limited relative movement of the piston rods of the piston and cylinder mechanisms for the at least two wheel assemblies as the planter assembly traverses on uneven ground;

the electrical-hydraulic control means including hydraulic circuit means for supplying and relieving pressurized hydraulic fluid from the piston and cylinder mechanism for the at least two wheel assemblies on each side of the planter assembly, said hydraulic circuit means including flow divider means for dividing pressurized hydraulic fluid from a source thereof in equal amounts to the respective parallel coupled piston and cylinder mechanisms on a forward stroke of the piston rod of each mechanism for the at least two wheel assemblies on each side of the planter assembly;

said flow divider means of the hydraulic circuit means comprising a rotary flow divider for dividing an input or output of hydraulic fluid to or from the parallel coupled piston and cylinder mechanisms into two increments and, on the delivery of pressurized hydraulic fluid to the wheel assemblies, delivering each increment to one of two separate hydraulic lines each of which is coupled to the parallel coupled piston and cylinder mechanisms for the at least two wheel assemblies on one side of the planter assembly;

the electrical-hydraulic control means characterized wherein said rotary flow divider includes a shaft which makes one revolution for each increment of pressurized hydraulic fluid which is admitted to or relieved from the parallel coupled piston and cylinder mechanisms for the wheel assemblies on one side of the planter assembly, and wherein said control means include electrical sensing means for sensing each revolution of said shaft and for generating an electrical signal, counter circuit means having a first input connected to said electrical sensing means and a second input for receiving a predetermined count which is related to the number of increments which pass through said rotary flow divider to result in retraction of the piston rods in the piston and cylinder mechanisms said predetermined limit less than the full return stroke of each piston rod, said counter circuit means being operable to decrement said predetermined count on each count received from said electrical sensing means as pressurized hydraulic fluid is being supplied to the parallel coupled piston and cylinder mechanisms to retract the piston rods therein to lower the wheel assemblies to lower the planter units until the predetermined count is decremented to zero where said counter circuit means generates a control signal which is supplied to a solenoid operated valve in the supply line from the source of pressurized hydraulic fluid to close said valve to stop the flow of pressurized hydraulic fluid to the piston and cylinder mechanisms.

7. The electrical-hydraulic control means according to claim 6 wherein said counter circuit means include means for permitting a negative count of decrements past zero, after the predetermined count has been decremented to zero so there is a time delay from the time said control signal is generated by said counter circuit means to the time said solenoid operated valve is closed.

8. The electrical-hydraulic control means according to claim 6 including a set-reset bistable multivibrator, a driver circuit having an input coupled to the output of said bistable multivibrator and an output coupled to the solenoid operated valve in the supply line, said counter circuit means having an output coupled to a reset input of said set-reset bistable multivibrator, said output of said bistable multivibrator having a solenoid valve-open-signal level state and a solenoid-valve-close signal level state and being reset to said valve-close-signal level state by said control signal from said counter circuit means to cause closing of said solenoid-operated valve in said supply line after said predetermined count has been decremented to zero.

9. The electrical-hydraulic control means according to claim 8 including a main valve assembly mounted in the cabin of the tractor and having at least three positions, said first position being a neutral position, said second position being a down wheel/up planter position for coupling a line from a pump to said rotary flow divider which is coupled at the output thereof to the head sides of the cylinders of the piston and cylinder mechanisms and coupling a line leading to a sump to said solenoid valve which is coupled on the other side thereof to the rod sides of the cylinders, and said third position being an up wheel/down planter position for coupling said pump to said solenoid and said sump to said rotary flow divider.

10. The electrical-hydraulic control means according to claim 9 including a pressure sensing device coupled to the head side of the cylinders and being operable to generate a pressure signal upon sensing a high pressure when said piston rods have been fully extended to fully raise said planters and said electrical-hydraulic control means including pressure sensing electrical circuit means coupled to the output of said pressure sensing device and comprising an integrator circuit, a pressure/monostable multivibrator having an input coupled to the output of said integrator and an output coupled to a reset input of said counter circuit means, said pressure/monostable multivibrator being operable, after a count of increments of fluid passing through the flow divider has been counted and the pressure has been built up in the cylinder with the piston rods fully extended for a predetermined period of time, to generate a clear signal which is supplied to the reset input of said counter circuit means to clear the incremental count within said counter circuit means and input said predetermined count at said second input thereof.

11. The electrical-hydraulic control means according to claim 10 wherein said pressure/monostable multivibrator has an inverted output which is coupled to the set input of said set-reset bistable multivibrator, said inverted output supplying a set signal to said set-reset bistable multivibrator when the other output thereof is supplying a clear signal to said counter circuit means thereby to set the output of said set-reset bistable multivibrator to said solenoid-valve-open signal level state.

12. The electrical-hydraulic control means according to claim 11 wherein said counter circuit means, after having the incremental count therein cleared by the signal from said monostable multivibrator and then having said predetermined count inputted at said second input thereof, are enabled to decrement a count received at said first input from said predetermined count when said piston rods are being retracted to raise said wheel assemblies and lower said planter units so that, after said predetermined count has been decremented to zero, a control signal is generated and supplied to said reset input of said set-reset bistable multivibrator to change the output thereof to said solenoid-valve-close signal level state to close said solenoid valve to limit the retraction of the piston rods to said predetermined limit.

13. The electrical-hydraulic control means according to claim 11 wherein the planter assembly includes hydraulically operated markers, one mounted on each side of the planter assembly, a piston and cylinder mechanism associated with each marker for causing extension or retraction of the marker, and a marker-solenoid-operated valve associated with each piston and cylinder assembly and operable when energized to open the valve to admit hydraulic fluid to the piston and cylinder mechanism for raising and retracting the marker and operable when de-energized for relieving pressurized hydraulic fluid from the piston and cylinder mechanism to cause extension of the marker, and wherein said electrical-hydraulic control means include a marker advance switch in the cabin of the tractor for causing retraction of one marker and extension of the other marker and a marker electrical circuit comprising an integrator circuit connected to the output of said marker advance switch, a marker/monostable multivibrator having an input coupled to the output of said integrator circuit and an output coupled to a clock input of a gating circuit, a NAND gate, and a toggle bistable multivibrator, an inverted output of said gating circuit being coupled to said NAND gate which has an output coupled to said clock input of said tobble bistable multivibrator which has a first output coupled to a driver circuit for operating one of the marker solenoids and has a second inverted output coupled to a driver circuit for operating the other marker solenoid, said NAND gate also having an input coupled to the inverted output from said pressure/monostable multivibrator such that operation of said pressure sensing device causing the generation of an inverted signal at said inverted output of said pressure/monostable multivibrator is applied to said NAND gate to supply a clock signal to said toggle bistable multivibrator to toggle same to energize one marker solenoid and de-energize the other marker solenoid when the piston rods of said piston and cylinder mechanisms have been fully extended to fully raise the planters, and said marker advance switch being operable on the first actuation thereof when the planters are fully raised to generate a signal at the output of said marker monostable multivibrator output which is passed through said gating circuit and through said NAND gate to said clock input of said toggle bistable multivibrator to change the energization and de-energization of the marker solenoids.

14. The electrical-hydraulic control means according to claim 13 including an inhibit gate having an input coupled to the output of said set-reset bistable multivibrator and having an inverted output coupled to a reset input of said gating circuit, the inverted output of said marker/monostable multivibrator being coupled to a control NAND gate, the output of which is coupled to the set input of said set-reset bistable multivibrator, said inverted output of said pressure/monostable multivibrator also being coupled to an input to said control NAND gate, the solenoid valve-close-signal level state at the output of said set-reset bistable multivibrator when the planters are in a lower position being coupled to said input to said inhibit gate to provide an inhibit signal to said reset input of said gating circuit, such that operation of said marker advance switch to generate a signal at the output of said marker advance/monostable multivibrator is not passed through said gating circuit, while at the same time, the signal from the inverted output of said marker advance/monostable multivibrator is supplied to said control NAND gate to set said set-reset bistable multivibrator to change the output thereof to a solenoid valve-open-signal level state which is supplied to the inhibit gate to change the output thereof to an enable output that is supplied to the reset input of said gating circuit, whereby on the next operation of said marker advance switch, said toggle bistable multivibrator is toggled to change the energization and de-energization of the marker solenoid.

* * * * *